(12) United States Patent
Jurena et al.

(10) Patent No.: US 8,944,403 B2
(45) Date of Patent: Feb. 3, 2015

(54) BLOWOUT PREVENTER WITH PRESSURE-ISOLATED OPERATING PISTON ASSEMBLY

(75) Inventors: Johnny E. Jurena, Cypress, TX (US); David J. McWhorter, Pinehurst, TX (US); Charles E. Gibbs, Stafford, TX (US); Steven F. Shimonek, League City, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/553,671

(22) Filed: Jul. 19, 2012

(65) Prior Publication Data
US 2014/0021381 A1 Jan. 23, 2014

(51) Int. Cl.
*E21B 33/06* (2006.01)
*F16K 51/00* (2006.01)

(52) U.S. Cl.
CPC ............... *E21B 33/063* (2013.01); *F16K 51/00* (2013.01)
USPC .......................................... 251/1.3; 166/85.4

(58) Field of Classification Search
CPC ....... F16K 51/00; E21B 33/06; E21B 33/061; E21B 33/062; E21B 33/063
USPC ............ 251/1.1, 1.2, 1.3; 166/85.4, 363, 364; 277/324, 637, 638, 342
See application file for complete search history.

(56) References Cited

U.S. PATENT DOCUMENTS

| | | | | |
|---|---|---|---|---|
| 3,208,357 A | * | 9/1965 | Herbert et al. | 92/27 |
| 3,352,534 A | * | 11/1967 | Harley | 251/356 |
| 4,214,605 A | * | 7/1980 | Hardgrave | 137/495 |
| 4,290,577 A | | 9/1981 | Olson | |
| 4,488,703 A | * | 12/1984 | Jones | 251/77 |
| 4,582,293 A | * | 4/1986 | Jones | 251/1.3 |
| 4,601,232 A | * | 7/1986 | Troxell, Jr. | 92/24 |
| 4,877,217 A | * | 10/1989 | Peil et al. | 251/1.3 |
| 4,943,031 A | * | 7/1990 | Van Winkle | 251/1.3 |
| 4,969,390 A | * | 11/1990 | Williams, III | 92/28 |
| 5,199,683 A | | 4/1993 | Le | |
| 5,287,879 A | * | 2/1994 | Leggett et al. | 137/246.22 |
| 6,845,958 B2 | * | 1/2005 | Wood et al. | 251/1.1 |
| 7,374,146 B2 | | 5/2008 | Whitby et al. | |
| 2005/0242308 A1 | | 11/2005 | Gaydos | |
| 2012/0055679 A1 | | 3/2012 | Van Winkle | |

OTHER PUBLICATIONS

Copenheaver, International Search Report and Written Opinion for PCT/US2013/051004, mailed Dec. 23, 2013.

* cited by examiner

*Primary Examiner* — John Bastianelli
*Assistant Examiner* — Andrew J Rost
(74) *Attorney, Agent, or Firm* — Eubanks PLLC

(57) ABSTRACT

A ram-type blowout preventer including an operating piston assembly isolated from wellbore pressure effects is provided. In one embodiment, a blowout preventer includes piston coupled to a ram by a connecting rod, and the connecting rod is inserted into a recess in the ram. A pressure-isolating seal may be provided in the recess between the connecting rod and the ram to isolate the end of the connecting rod within the recess from wellbore pressure in the blowout preventer. Additional systems, devices, and methods are also disclosed.

12 Claims, 11 Drawing Sheets

BLOWOUT PREVENTER WITH PRESSURE-ISOLATED OPERATING PISTON ASSEMBLY

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

More particularly, wellhead assemblies often include a blowout preventer, such as a ram-type blowout preventer that uses one or more pairs of opposing rams that press against one another to restrict flow of fluid through the blowout preventer. The rams typically include main bodies (or ram blocks) that receive sealing elements (or ram packers) that press together when a pair of opposing rams close against one another. Often, the rams are driven into and out of a main bore of a blowout preventer by operating pistons coupled to the rams by connecting rods. In a common design, a ram block includes a slot for receiving a button on the end of a connecting rod, which allows the operating piston and connecting rod to push and pull the ram block within the blowout preventer.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to systems having rams and operating piston assemblies in which the operating piston assemblies are isolated from certain pressure effects in the systems. More specifically, in some embodiments blowout preventers include operating piston assemblies with connecting rods coupled to rams and have seals between the connecting rods and the rams that isolate end faces of the connecting rods from wellbore pressure within the blowout preventer. This isolation may eliminate retraction forces that would otherwise be applied to the connecting rods by the wellbore pressure when the rams are closed at pressure, thereby decreasing forces transferred to wedge lock mechanisms that hold the rams in the closed position and increasing system efficiency. This isolation may also reduce the wellbore assist effect on the ram assemblies when closed at pressure, thereby increasing sealing fatigue life. In one embodiment, rather than being received laterally in a slot open to both an end face and a side of the ram, the connecting rod is threaded into a recess in the end face of the ram. Additionally, some embodiments also include relief paths that allow fluid within pressure-isolated regions in recesses of the rams to escape.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
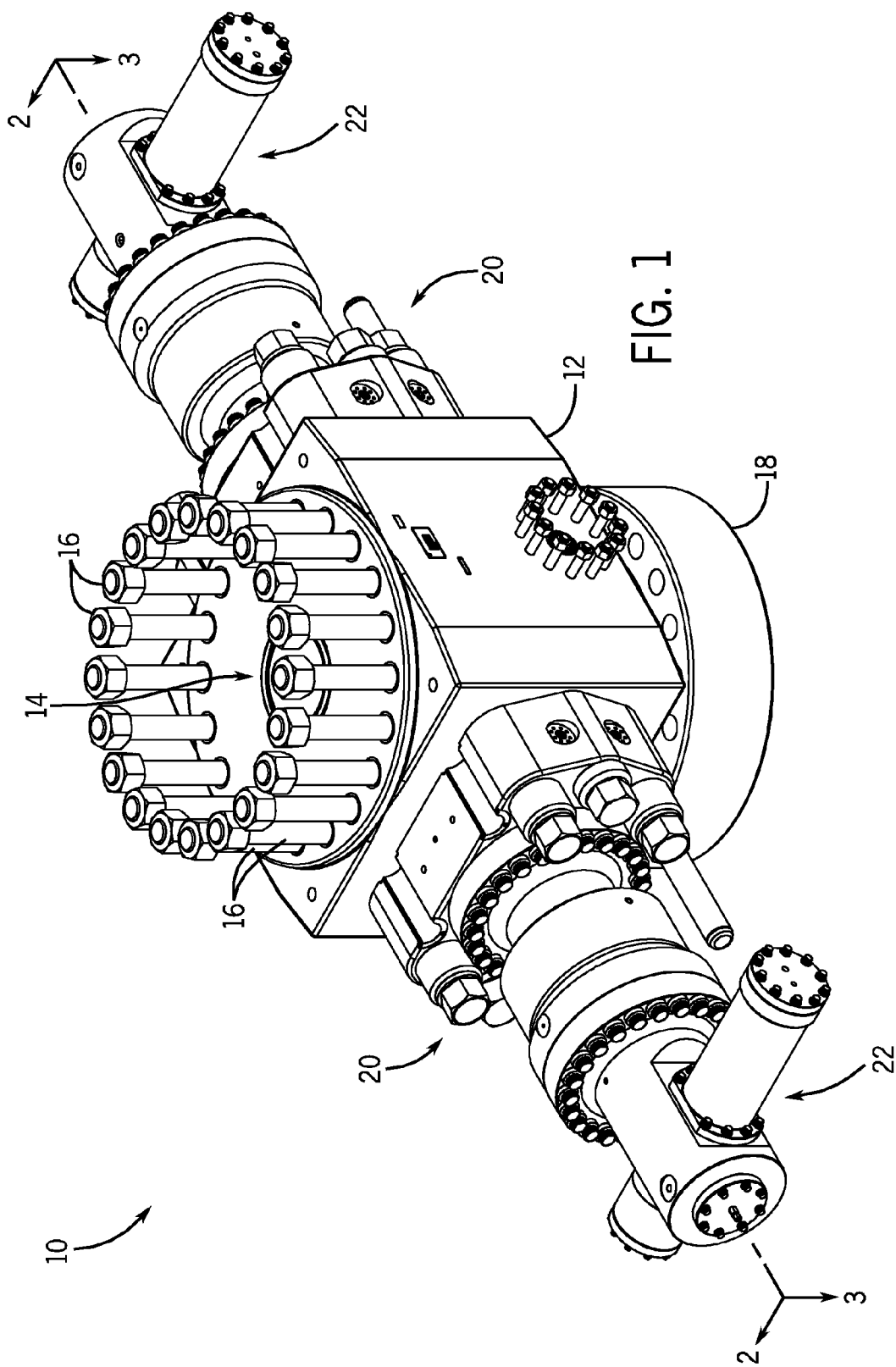
FIG. 1 is a perspective view of a blowout preventer having a pair of rams that may be extended into a bore of the blowout preventer to restrict flow through the bore in accordance with an embodiment of the present disclosure.

Turning now to the drawings, a blowout preventer 10 is illustrated in FIG. 1 by way of example. The depicted blowout preventer 10 includes a hollow main body 12 and a bore 14 that enables passage of fluid or tubular members through the blowout preventer 10. As will be appreciated, the blowout preventer 10 may be coupled to other equipment that facilitates natural resource production. For instance, production equipment or other components may be attached to the top of the blowout preventer 10 via fasteners 16 (provided in the form of studs and nuts in FIG. 1) and the blowout preventer 10 may be attached to a wellhead or spool via flange 18 and additional fasteners.

Bonnet assemblies 20 secured to the main body 12 include various components that facilitate control of sealing rams disposed in the blowout preventer 10, and locking assemblies 22 enable the sealing rams to be locked in a closed position. Particularly, as illustrated in the cross-sections of FIGS. 2 and 3, the blowout preventer 10 includes a pair of rams 24 actuated by operating piston assemblies that include pistons 26 and connecting rods 28. In operation, a force (e.g., from hydraulic pressure) may be applied to the operating pistons 26 to drive the rams 24 into the bore 14 of the blowout preventer 10. The rams 24 include sealing elements 30, also known as ram packers, that cooperate with one another when driven together to seal the bore 14 and inhibit flow through the blowout preventer 10. When these the rams 24 are moved into the closed position to seal the bore 14, wedge locks 34 (FIG. 3) of the locking assemblies 22 may be moved into position behind tail rods of the pistons 26 to hold the rams 24 in the closed position. This allows the hydraulic pressure acting on the pistons 26 to be reduced (from the closing pressure) while still maintaining the rams 24 in the closed position.

Figure 2:
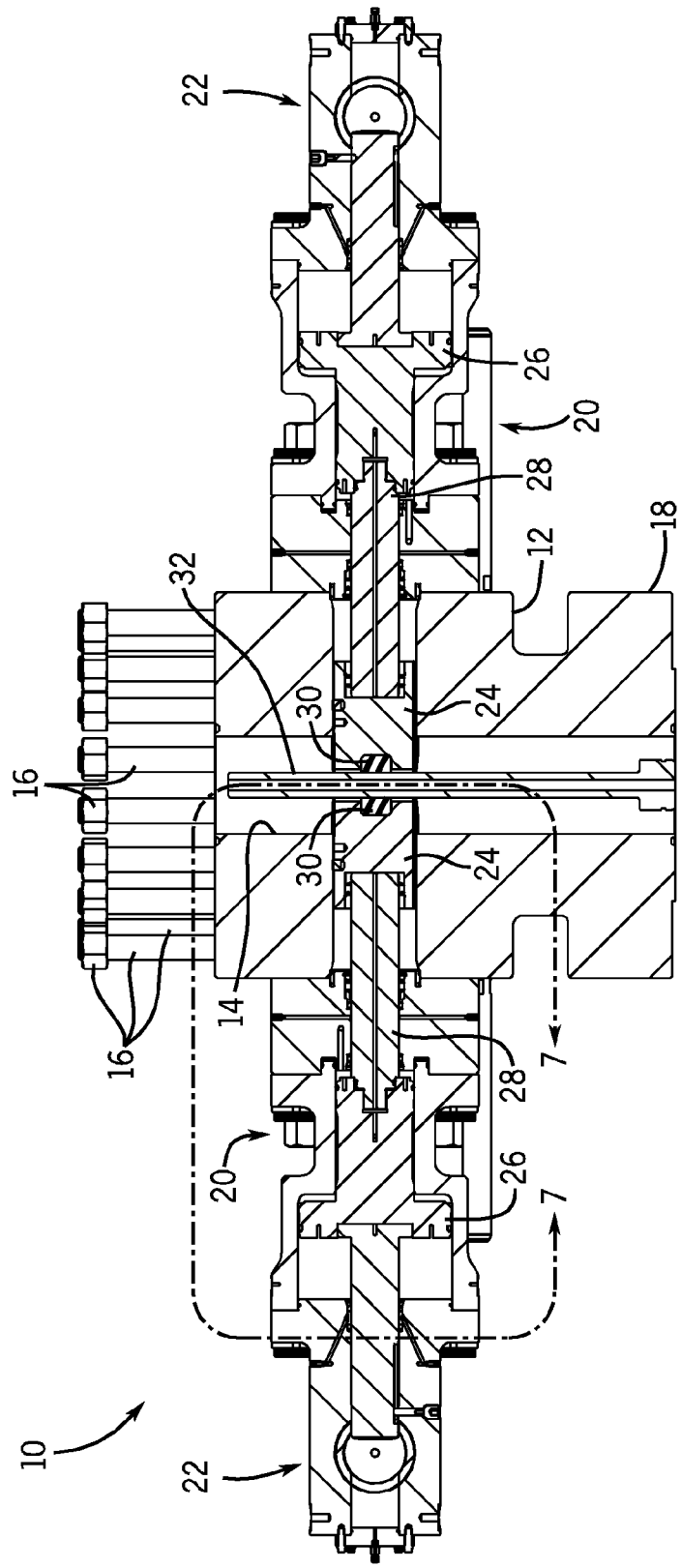
FIG. 2 is a vertical cross-section of the blowout preventer of FIG. 1, depicting operating piston assemblies coupled to rams in accordance with one embodiment.
Figure 3:
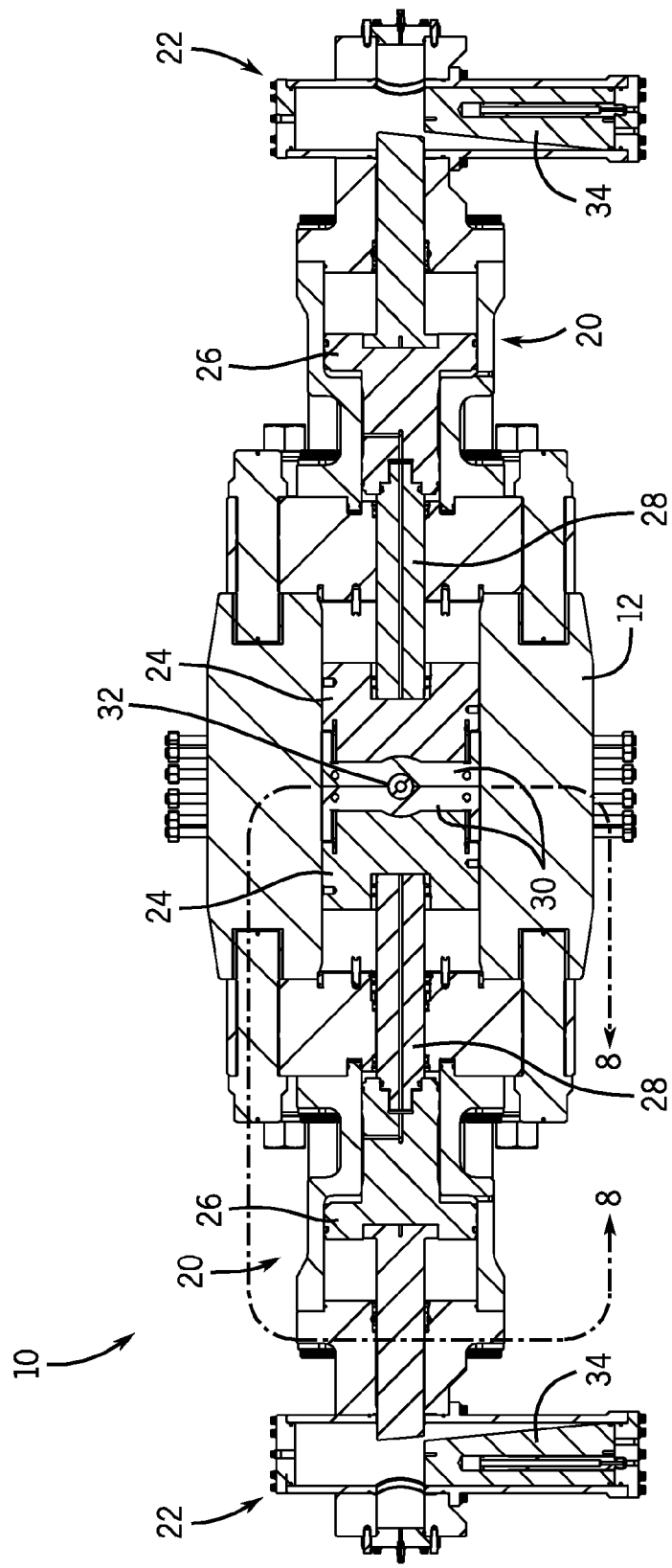
FIG. 3 is a horizontal cross-section of the blowout preventer of FIG. 1 also depicting operating piston assemblies coupled to rams and wedge lock mechanisms that may be engaged to hold the rams in a closed position.
Figure 4:
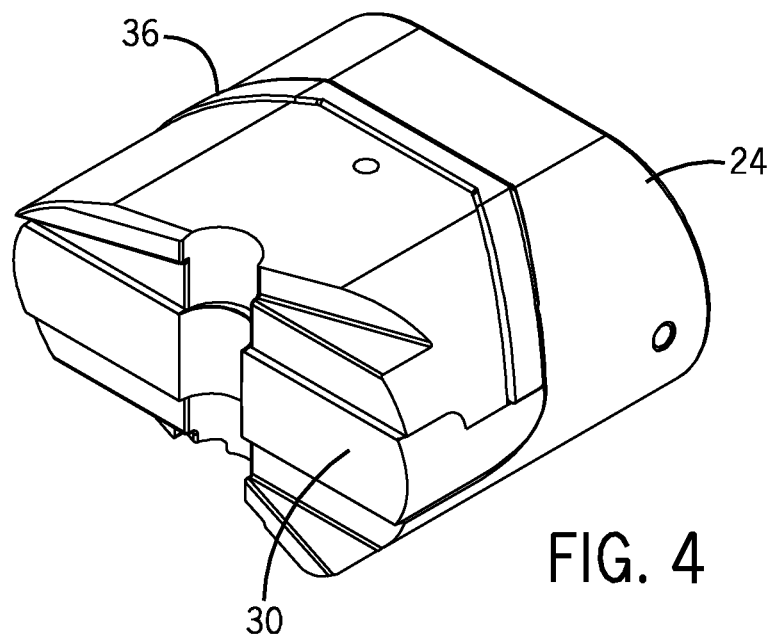
FIGS. 4 and 5 depict a ram of the blowout preventer of FIG. 1 in accordance with one embodiment.
Figure 5:
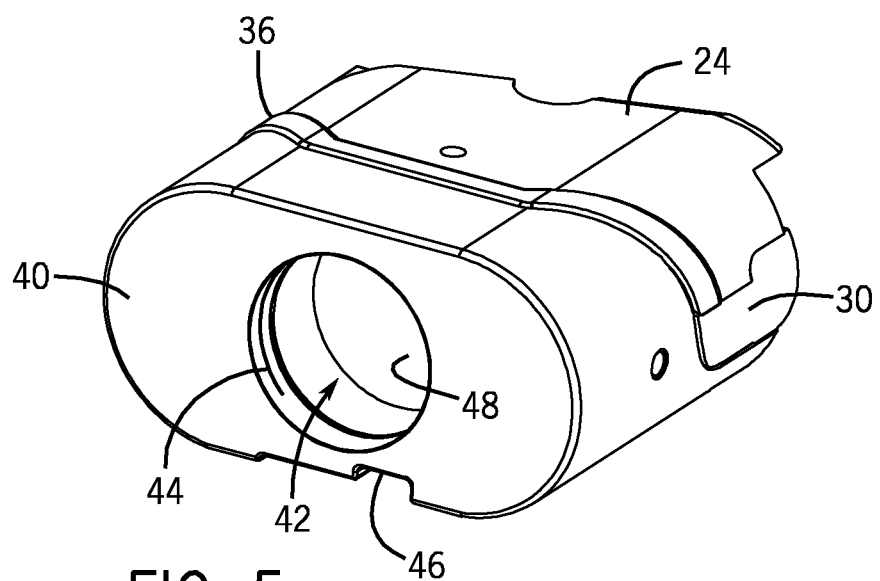

In the embodiment depicted in FIGS. 2 and 3, the rams 24 are provided in the form of pipe rams configured to seal against one another and about pipe 32 (or another tubular member) in the bore 14. A more detailed example of a ram 24 in the form of a pipe ram is illustrated in FIGS. 4 and 5 and described further below. But it is first noted that rams 24 may be of any desired size and may vary depending on the intended application. For example, different pipe rams 24 may be sized for use with blowout preventers having various bore diameters and the ram packers 30 may be selected according to the diameter of the pipe about which the ram packers 30 are intended to seal. In other embodiments, the rams 24 include variable-bore pipe rams that may be used to seal around pipes having a range of diameters (e.g., $2\frac{7}{8}$ to 4 inches, $2\frac{7}{8}$ to 5 inches, or $3\frac{1}{2}$ to $5\frac{7}{8}$ inches). And although rams 24 are depicted as pipe rams in FIGS. 2-5, still other embodiments could include different rams (e.g., blind rams or shear rams).

Again with reference to FIGS. 4 and 5, the depicted ram 24 includes a top seal 36 in addition to the ram packer 30. The top seal 36 abuts the surface of the main body 12 above the ram 24 in FIG. 2 and, with the ram packer 30, seals upper and lower portions of the bore 14 from one another. The ram packer 30 and top seal 36 are formed of any suitable material, such as an elastomer. The ram 24 may include latching features to mate with corresponding features of an opposing ram, such as the angled features of the ram above and below the front face of the ram packer 30 in FIG. 4. And as depicted in FIG. 5, the end face 40 of the ram 24 includes a recess 42 having a threaded interior surface 44 and a bottom 48 for receiving an end of the connecting rod 28, although the ram 24 and the connecting rod 28 may be coupled differently (e.g., a snap ring) in other embodiments.

Figure 6:
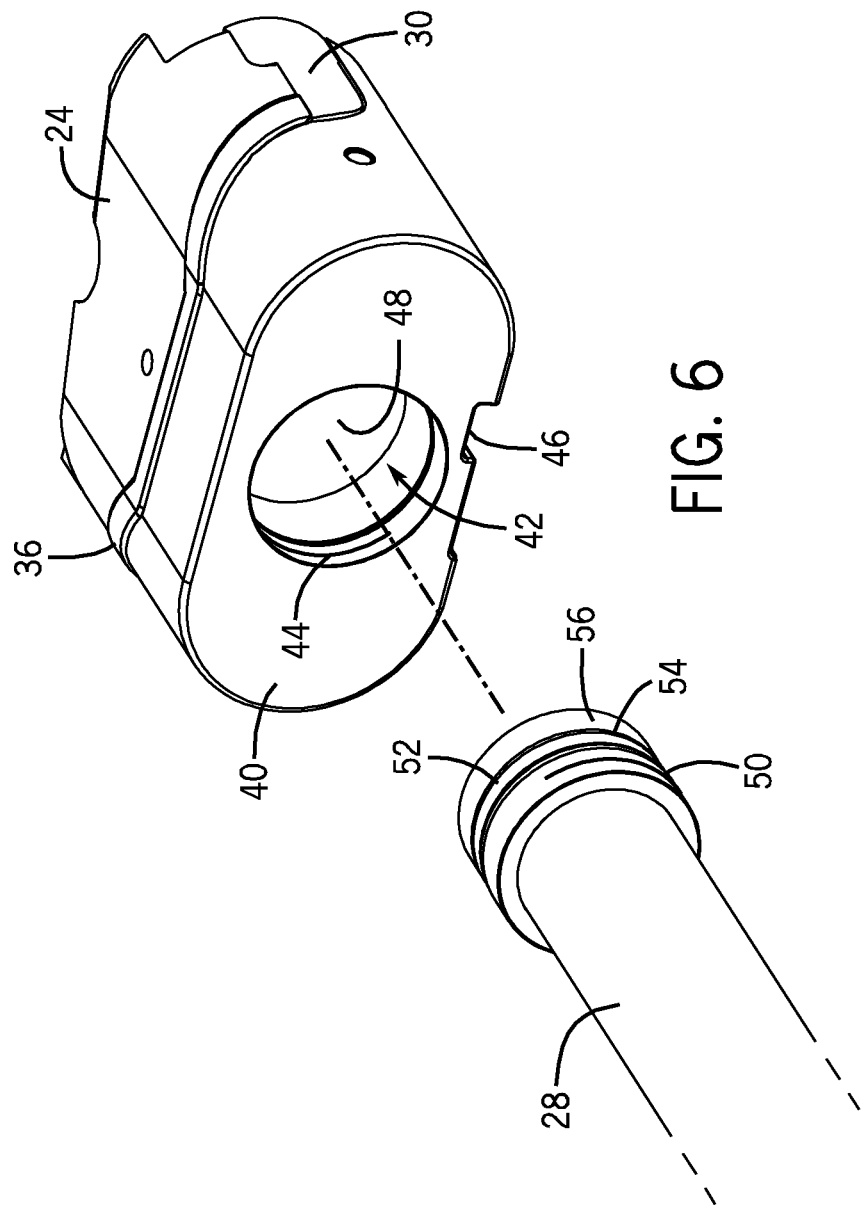
FIG. 6 is an exploded view illustrating a connecting rod with the ram of FIGS. 4 and 5 in accordance with one embodiment in which the connecting rod may be coupled to the ram by inserting the connecting rod into a recess formed in an end face of the ram.

In some embodiments, such as that of FIG. 5, the recess 42 is formed entirely in the end face 40 without extending to a lateral edge or side 46 of the ram 24. In such an arrangement, the recess 42 may be aligned with the longitudinal axis of the connecting rod 28, which may then be coupled to the ram 24 by inserting the connecting rod 28 into the recess 42 along the longitudinal axis. In one embodiment generally shown in FIG. 6, an end of the connecting rod 28 includes a sealing assembly that enables the connecting rod 28 to be secured to the ram 24 via the recess 42. Particularly, the depicted sealing assembly includes (in order along the connecting rod 28) a retaining nut 50, a seal 52, a spacer 54, and another retaining nut 56. The retaining nut 50 includes a threaded exterior surface configured to mate with the threaded interior surface 44 of the recess 42. As a result, the connecting rod 28 may be threaded into the recess 42 and retained within the ram 24 by mating engagement of the threads of the surface 44 and the retaining nut 50. The retaining nut 56 includes a threaded interior surface and is threaded onto the end of the connecting rod 28 to retain the seal 52 and the spacer 54 on the connecting rod 28.

The seal 52 may be formed of any suitable material, such as an elastomer. Once installed in the recess 42, the seal 52 seals against the bore of the recess 42 and isolates a region along an end face of the connecting rod 28 in the recess 42 from pressure on the other side of the seal 52 (e.g., pressure at the end face 40 of the ram 24). Such isolation reduces retraction force on the connecting rod 28 when the ram 24 is actuated into a sealing position. Particularly, when the rams 24 of the blowout preventer 10 are closed, wellbore pressure in the blowout preventer 10 (e.g., within the bore 14 below the rams 24 in FIG. 2) is communicated to regions behind the rams 24 (i.e., between the bonnet assemblies 20 and the end faces 40 of the rams 24). Having the wellbore pressure behind the rams 24 when in the closed position provides a "wellbore assist effect" in that the wellbore pressure applies forces against the end faces 40 of the rams 24 toward the bore 14 of the blowout preventer 10.

While this wellbore assist effect may help keep rams of a blowout preventer closed at pressure, left unchecked this same wellbore pressure would also apply a retraction force to the end face of a connecting rod in a ram, which in essence operates to try to push the connecting rod away from the bore of the blowout preventer and back into a bonnet assembly. If the operating pistons are not locked into place, a sufficiently large retraction force could cause the rams to open or leak. Also, in arrangements including a connecting rod having a button received in a slot of a ram, a sufficiently large retraction force could damage the button or the slot.

But unlike previous arrangements susceptible to this retraction force, present embodiments include a seal (such as seal 52) that isolates the operating piston assembly, and particularly the end face of the connecting rod in the ram, from wellbore pressure. This isolation reduces or eliminates the retraction force on the end face of the connecting rod from the wellbore pressure. The reduction of the retraction force on the connecting rod increases the closing ratio of the actuating piston and ram assembly, resulting in more efficient operation of the operating piston. And this increase in efficiency enables the system to be used at greater maximum pressures or to be reduced in size while handling the same maximum pressure as before. While the present pressure-isolated arrangement may be used in blowout preventers (or other sealing systems) of any rated pressure, this arrangement may find particular use in blowout preventers with higher pressure ratings, such as 20,000 psi, 25,000 psi, 30,000 psi, or even greater.

Figure 7:
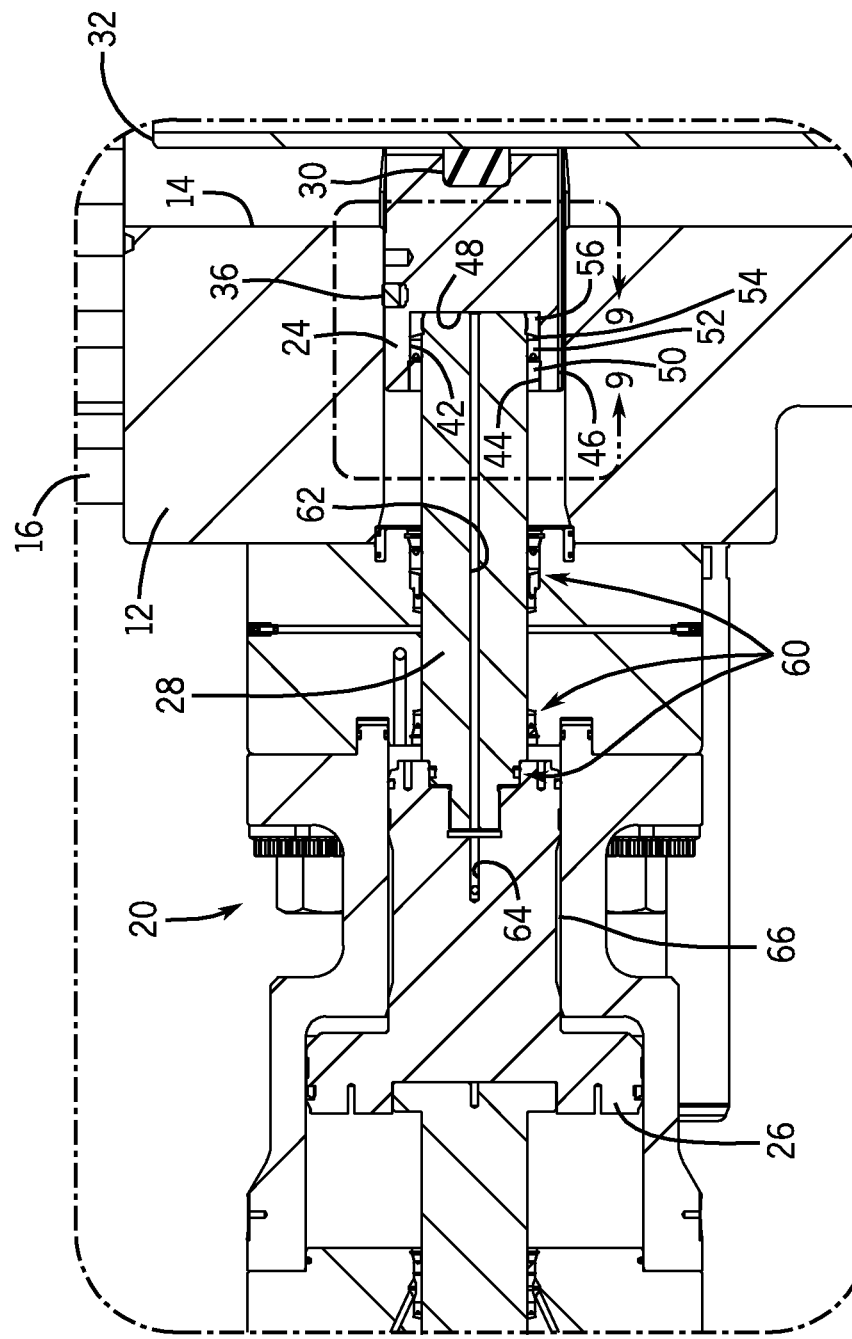
FIG. 7 is a detail view of the portion of the blowout preventer generally enclosed by the line 7-7 in FIG. 2 and depicts a connecting rod and ram assembly in which an end of the connecting rod in a ram is isolated from pressure about the connecting rod behind the ram in the blowout preventer.
Figure 8:
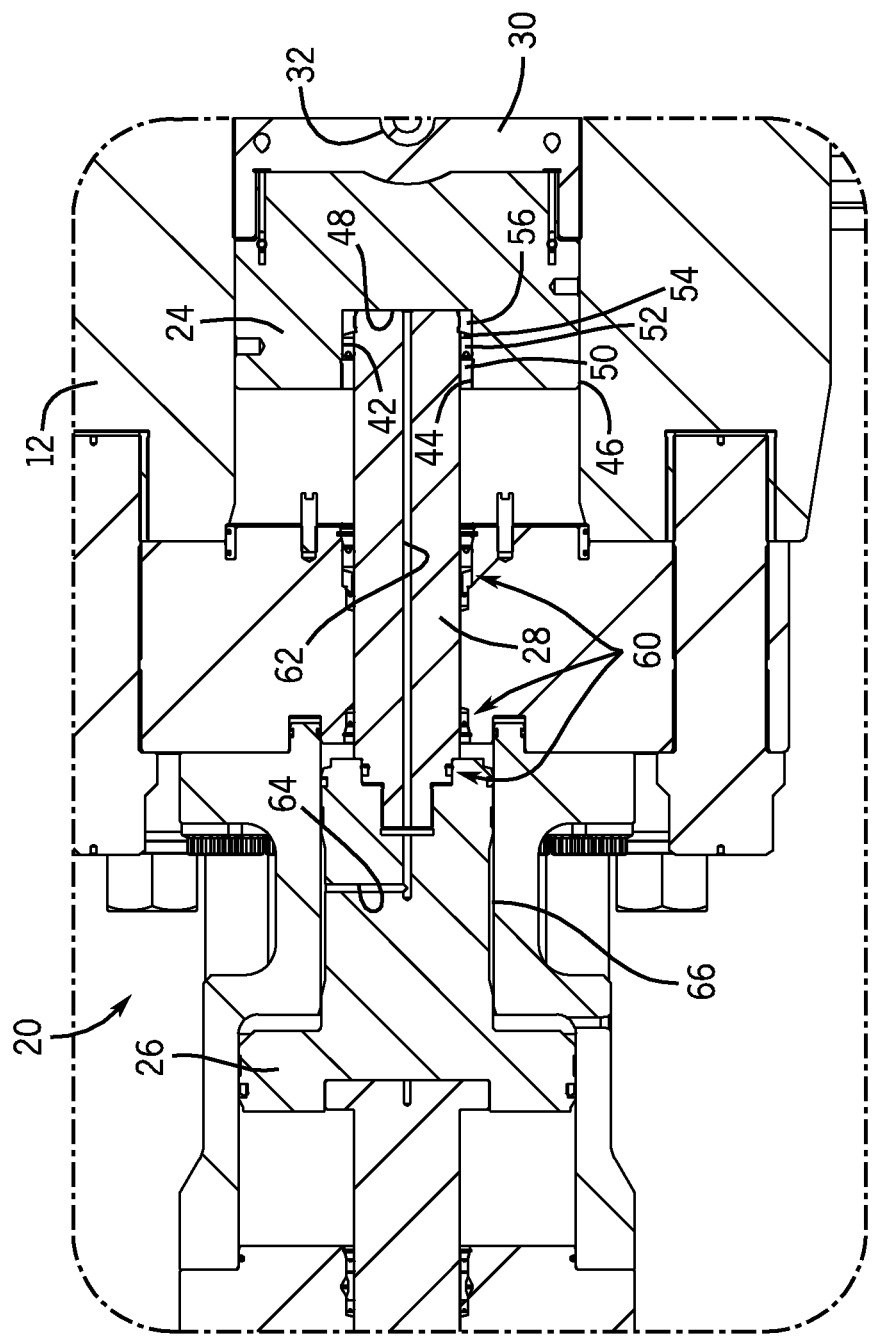
FIG. 8 is a detail view of the portion of the blowout preventer generally enclosed by line 8-8 in FIG. 3 and depicts the connecting rod and ram assembly of FIG. 7 with a relief path in the connecting rod and a piston for fluid to pass from the pressure-isolated region at the end of the connecting rod.
Figure 9:
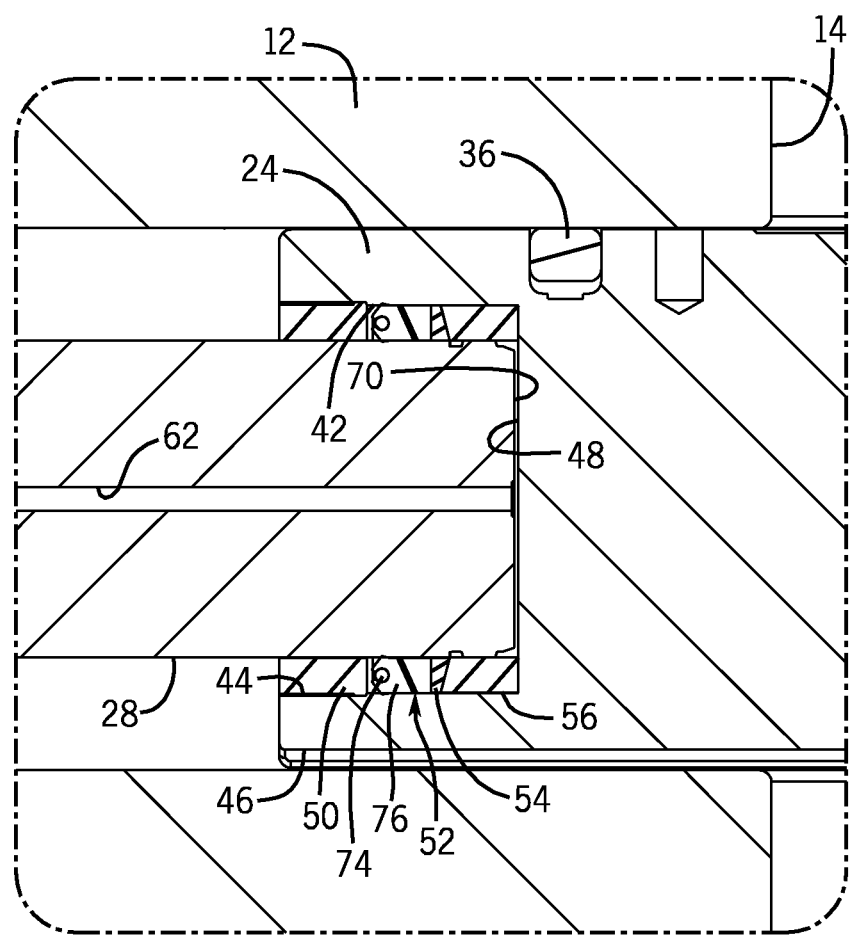
FIG. 9 is a further detail view of a portion of the blowout preventer generally enclosed by line 9-9 in FIG. 7, which more clearly illustrates a sealing assembly between the connecting rod and the ram that isolates an end of the connecting rod from wellbore pressure in accordance with one embodiment.

One ram 24 and its associated connecting rod 28 installed in the blowout preventer 10 are depicted in FIGS. 7-9 as an example. As shown in the cross-sections of FIGS. 7 and 8, the connecting rod 28 is coupled to the ram 24 on one end and to the piston 26 on the other end. In this embodiment, the connecting rod 28 is threaded into the piston 26. And in addition to the seal 52, other pressure-isolating seals are provided throughout the blowout preventer 10, such as seals 60 along the connecting rod 28.

As noted above, the inclusion of a pressure-isolating seal 52 between the connecting rod 28 and the ram 24 isolates the operating piston assembly from wellbore pressure effects, reducing or eliminating retracting pressure on the end face 70 (FIG. 9) of the connecting rod in the recess 42. The seal 52 may have any suitable configuration. For instance, in FIG. 9 the seal 52 is depicted as a two-piece seal with an inner seal component 74 and an outer seal component 76. In other embodiments the seal may have a different construction, such as a single-component seal. Additionally, in some embodiments the portion of the recess 42 abutting the seal 52 may have a finish or an inlay that facilitates sealing or reduces wear.

But even with the pressure-isolating seal 52, it is possible in some instances that pressurized fluid may be present between the end face 70 and the bottom 48 of the recess 42. Consequently, in some embodiments the blowout preventer 10 includes a relief path (which may also be referred to as a vent path) leading away from the portion of the recess isolated by the seal 52 to allow fluid in the portion to escape from the recess 42. In the blowout preventer of FIGS. 7-9, this relief path includes passageways or conduits 62 and 64 through the connecting rod 28 and the piston 26. Particularly, rather than being trapped, fluid in the recess 42 behind the seal 52 (e.g., between the end face 70 of the connecting rod 28 and the bottom 48 of the recess 42) may escape the recess 42 by passing into an opening of conduit 62 in the end face 70 of the connecting rod 28 and through the conduit 62 to the conduit 64 of the operating piston 26. And in the present embodiment, the conduit 64 leads to a chamber 66 of the bonnet assembly 20 (which may be referred to as a "slack" chamber for the piston 26), allowing fluid to pass from the base of the recess 42 to the chamber 66.

Figure 10:
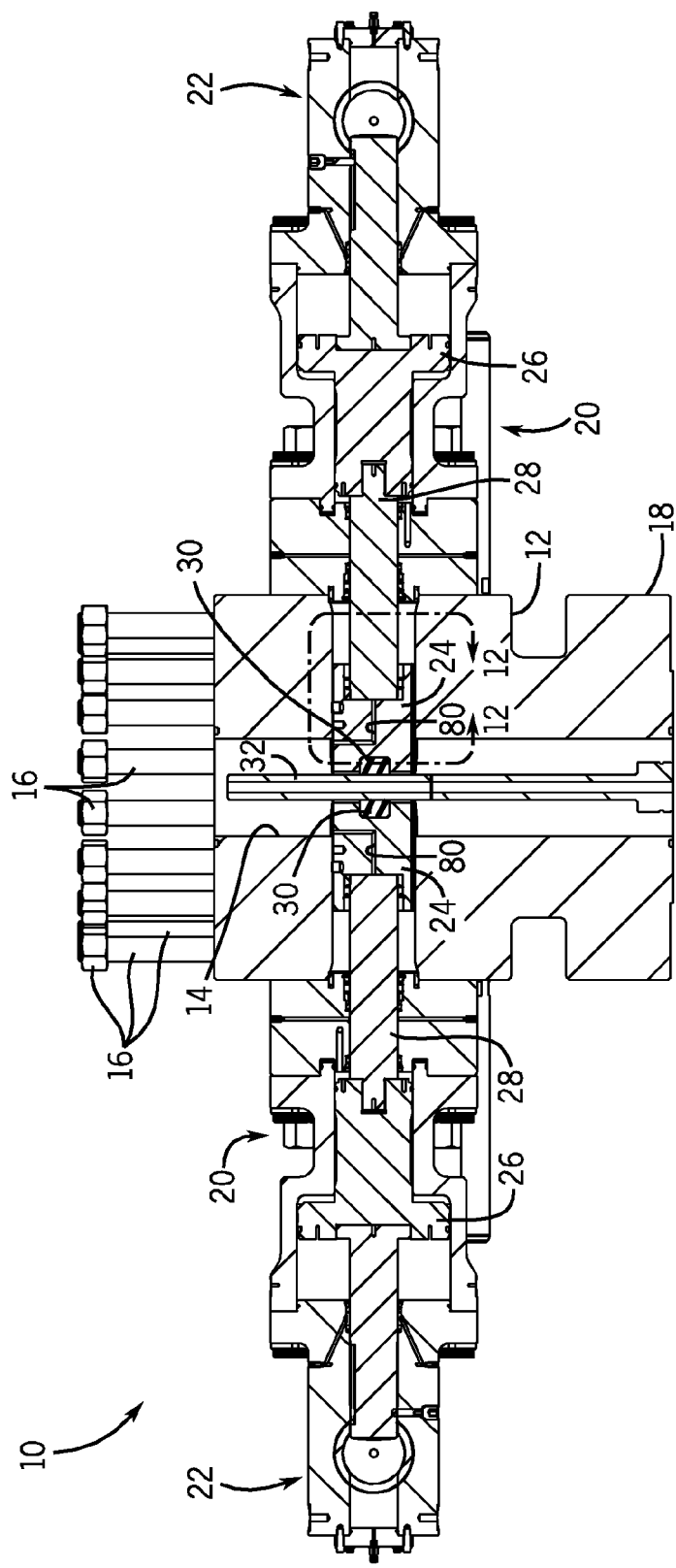
FIG. 10 is a horizontal cross-section of a blowout preventer having pressure-isolating seals between connecting rods and rams, as well as relief paths through the rams to allow the egress of fluid from the pressure-isolated regions about the ends of the connecting rods in the rams, in accordance with one embodiment.
Figure 11:
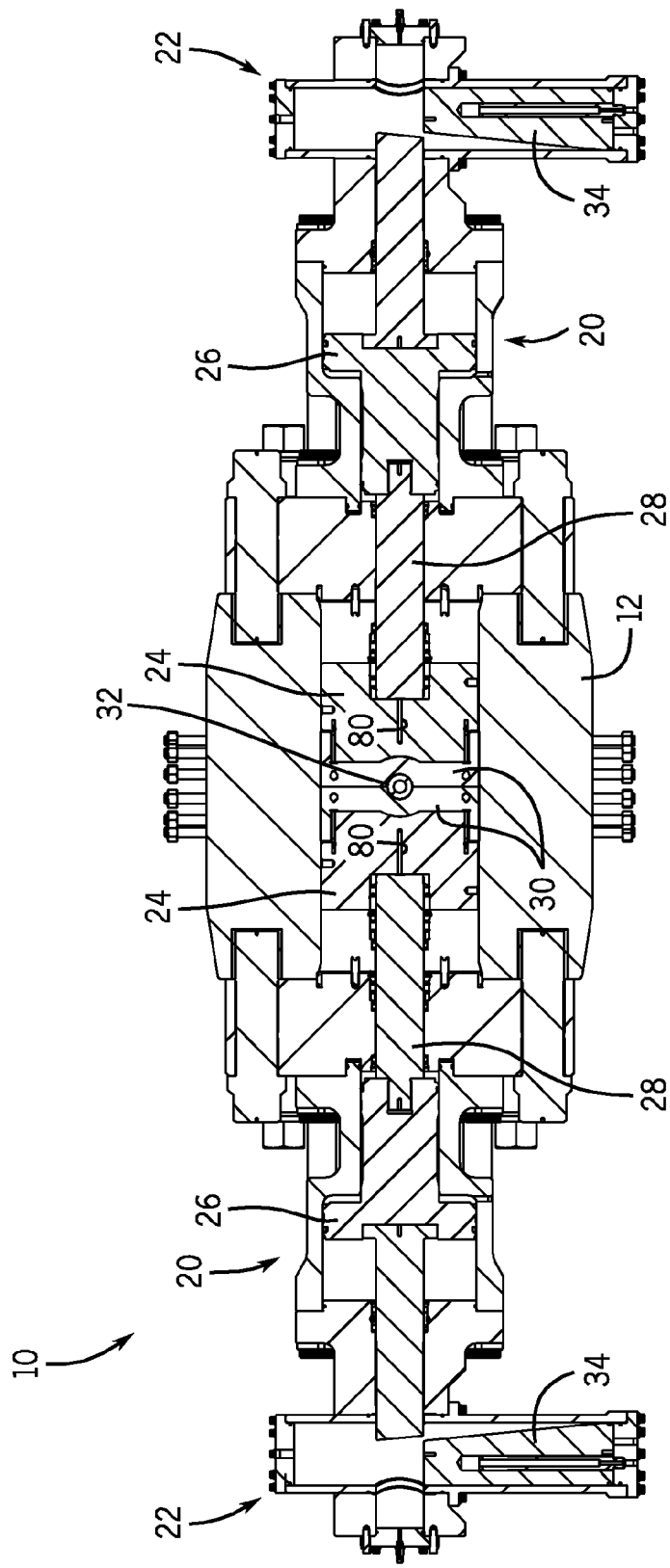
FIG. 11 depicts a vertical cross-section of the blowout preventer of FIG. 10.
Figure 12:
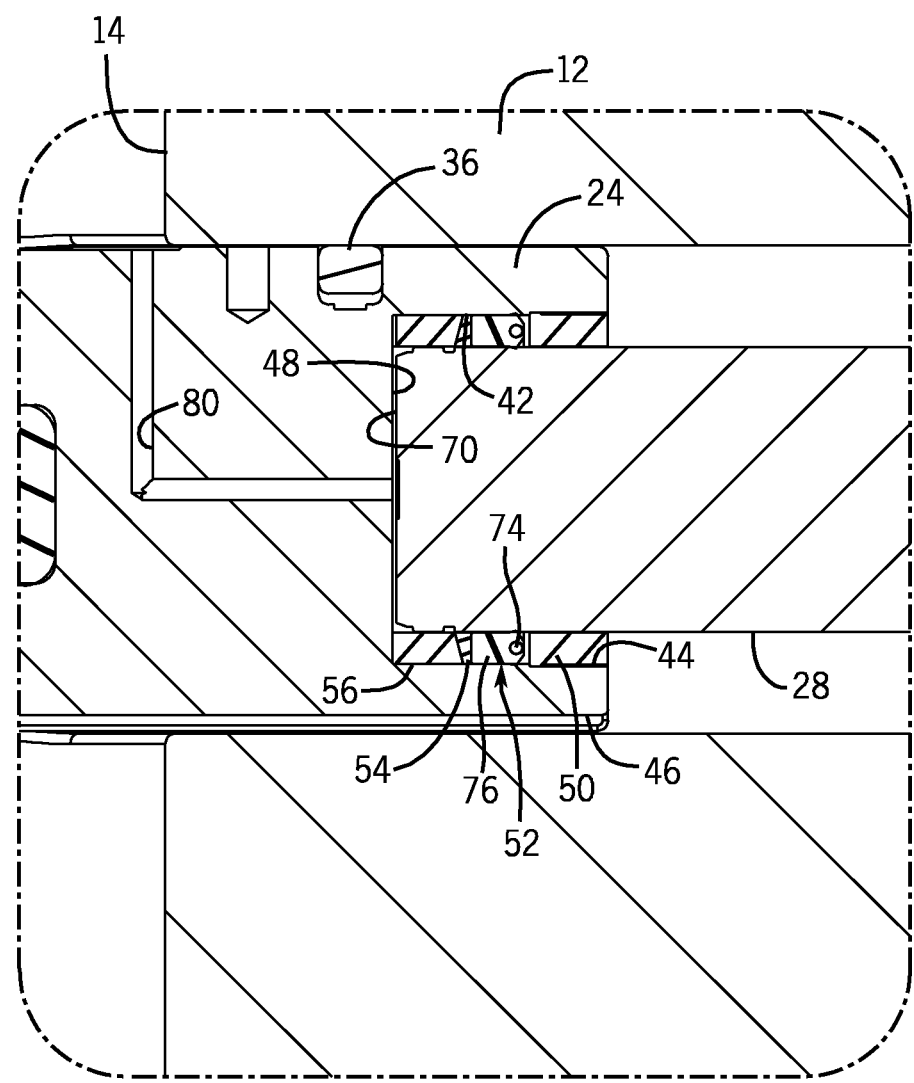
FIG. 12 is a detail view of the portion of the blowout preventer generally enclosed by line 12-12 in FIG. 10.

A blowout preventer 10 of another embodiment is depicted in the cross-sections provided in FIGS. 10-12. In these figures, the blowout preventer 10 includes different relief paths from the recesses 42, but is otherwise similar to the blowout preventer depicted in the previous figures. More specifically, rather than having relief paths from the recesses 42 that pass through the connecting rods 28, the pistons 26, and into slack chambers 66 in the bonnet assemblies 20, the blowout preventer 10 of FIGS. 10-12 includes relief paths, in the form of passageways or conduits 80, that extend through the rams 24 themselves. In this embodiment, fluid passes from the bottom of the recesses 42 behind the seals 52 of each ram 24, through the conduits 80, and into the bore 14 of the main body 12 of the blowout preventer.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
a blowout preventer including:
a hollow body;
a ram disposed in the hollow body; and
a bonnet assembly coupled to the hollow body, the bonnet assembly including a piston and a connecting rod that connects the piston to the ram to enable the piston to drive the ram within the hollow body, wherein the connecting rod includes an end face received by the ram and the connecting rod is coupled to the ram with a pressure-isolating seal, the pressure-isolating seal isolates the end face of the connecting rod received by the ram from wellbore pressure within the blowout preventer, and the ram, connecting rod, and pressure-isolating seal enable pressure within a pressure-isolated region between the end face of the connecting rod and the ram to be maintained below wellbore pressure within the blowout preventer when the ram is in a closed position in the hollow body.

2. The system of claim 1, comprising a locking assembly coupled to the bonnet assembly, the locking assembly including a wedge lock that enables the ram to be maintained in the closed position in the hollow body regardless of the level of hydraulic pressure on the piston.

3. The system of claim 1, comprising a relief path enabling fluid to exit the pressure-isolated region between the end face of the connecting rod and the ram to reduce the pressure within the pressure-isolated region.

4. The system of claim 3, wherein the relief path extends from the pressure-isolated region through the connecting rod.

5. The system of claim 4, wherein the relief path extends from the pressure-isolated region to a slack chamber within the bonnet assembly.

6. The system of claim 3, wherein the relief path extends from the pressure-isolated region through the ram.

7. The system of claim 1, wherein the ram is a pipe ram configured to seal against a pipe in the hollow body.

8. The system of claim 1, wherein:
the ram includes a recess having a threaded surface; and
the connecting rod is coupled to the ram with a pressure-isolating seal and with a threaded retaining nut that is positioned about the connecting rod and is in engagement with the threaded surface of the recess.

9. A system comprising:
a connecting rod;
a ram block including a recess formed in an end face of the ram block to enable receipt of the connecting rod within the recess, wherein the recess includes a threaded surface; and
a threaded retaining nut configured to be positioned about the connecting rod and to engage the threaded surface of the recess;
wherein the connecting rod and the ram block are constructed to allow the connecting rod to engage the recess by aligning the ram block with the longitudinal axis of the connecting rod and moving the connecting rod and the ram block together along the longitudinal axis such that the connecting rod enters the recess and into the ram block from the end face; the connecting rod and the ram block are assembled to one another such that the connecting rod is positioned within the recess of the ram block; the system further comprises a seal between the connecting rod and the ram block within the recess, wherein the seal isolates an end face of the connecting rod within the recess from pressure at the end face of the ram block; and the seal is disposed about the connecting rod between the threaded retaining nut with an exterior threaded surface and an additional retaining nut that is threaded onto the connecting rod via an interior threaded surface of the additional retaining nut.

10. The system of claim 9, comprising a spacer also disposed about the connecting rod between the threaded retaining nut and the additional retaining nut, wherein the spacer is positioned adjacent to the seal.

11. The system of claim 9, wherein at least one of the ram block or the connecting rod includes a relief path that enables fluid to escape from a portion of the recess that is between the seal and the bottom of the recess.

12. A system comprising:
a ram block including a recess formed in an end face of the ram block;
a connecting rod coupled to the ram block via a threaded retaining nut having an exterior threaded surface, wherein the threaded retaining nut is threaded into the recess of the ram block; and
a seal disposed within the recess between the connecting rod and the ram block, wherein the seal is disposed about the connecting rod between the threaded retaining nut with the exterior threaded surface and an additional retaining nut that is threaded onto the connecting rod via an interior threaded surface of the additional retaining nut.

* * * * *